United States Patent
Ninoyu et al.

(10) Patent No.: US 10,173,658 B2
(45) Date of Patent: Jan. 8, 2019

(54) VEHICLE CONTROL DEVICE

(71) Applicants: ADVICS CO., LTD., Kariya, Aichi-ken (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP); Yusuke Kamiya, Okazaki (JP); Daisuke Nakata, Seto (JP); Masaaki Komazawa, Miyoshi (JP)

(73) Assignees: ADVICS CO., LTD., Kariya, Aichi-Pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 28 days.

(21) Appl. No.: 15/115,496

(22) PCT Filed: Dec. 25, 2014

(86) PCT No.: PCT/JP2014/084232
§ 371 (c)(1),
(2) Date: Jul. 29, 2016

(87) PCT Pub. No.: WO2015/115007
PCT Pub. Date: Aug. 6, 2015

(65) Prior Publication Data
US 2017/0182990 A1 Jun. 29, 2017

(30) Foreign Application Priority Data
Jan. 31, 2014 (JP) ................. 2014-016823

(51) Int. Cl.
*B60T 13/68* (2006.01)
*B60T 8/1755* (2006.01)
(Continued)

(52) U.S. Cl.
CPC ............ *B60T 13/686* (2013.01); *B60T 7/042* (2013.01); *B60T 8/172* (2013.01); *B60T 8/1755* (2013.01);
(Continued)

(58) Field of Classification Search
CPC .... B60T 8/3265; B60T 8/4077; B60T 8/4827; B60T 8/4072; B60T 7/042
See application file for complete search history.

(56) References Cited

U.S. PATENT DOCUMENTS

| | | | |
|---|---|---|---|
| 6,196,641 B1 * | 3/2001 | Oka ...................... | B60T 8/3275 303/10 |
| 2007/0114842 A1 | 5/2007 | Ohkubo et al. | |

(Continued)

FOREIGN PATENT DOCUMENTS

| | | |
|---|---|---|
| JP | 2007-137281 A | 6/2007 |
| JP | 2013-107562 A | 6/2013 |

(Continued)

OTHER PUBLICATIONS

International Search Report (PCT/ISA/210) dated Mar. 19, 2015, by the Japanese Patent Office as the International Searching Authority for International Application No. PCT/JP2014/084232 (3 pages).

*Primary Examiner* — Bradley T King
*Assistant Examiner* — Stephen M Bowes
(74) *Attorney, Agent, or Firm* — Buchanan, Ingersoll & Rooney PC

(57) ABSTRACT

In a vehicular brake device, while a brake operating member is not operated and a wheel cylinder pressure supplying control is executed to supply the target wheel cylinder pressure to the respective wheel cylinders individually, the vehicle control device sets the target servo pressure to a first predetermined target servo pressure which is a value smaller than a maximum output pressure of the servo pressure (Continued)

generating device. When the execution of the wheel cylinder pressure supplying control starts, the vehicle control device sets the target servo pressure to be the target wheel cylinder maximum value when a firstly occurred rising inclination of the target wheel cylinder maximum value is equal to or more than a minimum increment of an output of the servo pressure generating device per unit time and at the same time when the target wheel cylinder pressure is smaller than the first determined target servo pressure.

5 Claims, 4 Drawing Sheets

(51) Int. Cl.

| | | |
|---|---|---|
| *B60T 7/04* | (2006.01) | |
| *B60T 13/14* | (2006.01) | |
| *B60T 13/66* | (2006.01) | |
| *B60T 8/40* | (2006.01) | |
| *B60T 8/172* | (2006.01) | |
| *B60T 8/48* | (2006.01) | |
| *B60T 13/74* | (2006.01) | |

(52) U.S. Cl.
CPC .......... *B60T 8/4077* (2013.01); *B60T 8/489* (2013.01); *B60T 13/146* (2013.01); *B60T 13/147* (2013.01); *B60T 13/662* (2013.01); *B60T 13/745* (2013.01)

(56) References Cited

U.S. PATENT DOCUMENTS

| | | | |
|---|---|---|---|
| 2008/0185241 A1* | 8/2008 | Isono | B60T 8/3655 188/151 R |
| 2011/0285199 A1* | 11/2011 | Ishida | B60T 7/042 303/3 |
| 2013/0080016 A1* | 3/2013 | Bohn | B60T 7/042 701/78 |
| 2013/0127238 A1 | 5/2013 | Masuda et al. | |
| 2013/0318963 A1* | 12/2013 | Masuda | B60T 13/147 60/591 |
| 2014/0008967 A1 | 1/2014 | Takeuchi et al. | |
| 2015/0035351 A1* | 2/2015 | Okano | B60T 8/48 303/10 |
| 2015/0127226 A1 | 5/2015 | Takeuchi et al. | |

FOREIGN PATENT DOCUMENTS

| | | |
|---|---|---|
| JP | 2014-004945 A | 1/2014 |
| JP | 2014-012456 A | 1/2014 |

* cited by examiner

CYLINDER OPENING SIDE ←→ CYLINDER BOTTOM SURFACE SIDE

VEHICLE CONTROL DEVICE

TECHNICAL FIELD

This invention relates to a vehicle control device which is used in a vehicle.

BACKGROUND ART

As one type of a vehicle brake device, a device which is disclosed in a Patent Literature 1 is known. As shown in FIG. 1 of the Patent Literature 1, the vehicle brake device includes a master cylinder 1 wherein master pistons 113 and 114 are driven to move by a servo pressure in a servo chamber 127 and by the movement of the master pistons, master pressure in the master chambers 132 and 136 changes, a mechanical type servo pressure generating device 44 connected to a high pressure source 431 and the servo chamber to generate the servo pressure in the servo chamber corresponding to the pilot pressure generated in a pilot chamber based on the brake hydraulic pressure of the high pressure source, an electric pilot pressure generating device 41, 42, 43 connected to the pilot chamber for generating a desired pilot pressure in the pilot chamber, a master-pilot connecting brake fluid passage 511 which connects the master chamber and the pilot chamber, and a brake actuator 53 which performs an ABS control and an ESC control and so on. The master-pilot connecting brake fluid passage is a passage branched from the master-wheel connecting passage 51 which connects the master chamber and the wheel cylinder 541, etc. The vehicle brake device includes a pressure sensor 74 which detects the servo pressure.

Generally, in a vehicle brake device as structured above, a target servo pressure is set which corresponds to the stroke amount of the brake pedal 115 when a normal braking operation is performed and then the pressure decreasing valve 41 and the pressure increasing valve 42 are controlled so that the target servo pressure and the actually detected servo pressure (actual servo pressure) agree with each other (feedback control). As the result, a master pressure which corresponds to the target servo pressure is outputted from the master cylinder and a wheel cylinder pressure which corresponds to the master pressure is applied to the wheel cylinders 541 through 544.

Further, the target servo pressure is set relatively a high pressure (for example, the maximum output pressure of the servo pressure generating device) when the ESC control (anti-skid control) or a TRC control (traction control) is performed. Accordingly, the servo pressure supplied from the servo pressure generating device 44 becomes relatively high and the pressure decreasing valve 41 and the pressure increasing valve 42 are feedback controlled to output the relatively high pressure master pressure from the master cylinder 1. Further, the holding valve and the pressure decreasing valve provided in the brake actuator 53 are controlled to apply desired wheel cylinder pressures individually to respective wheel cylinders. It is noted that a reason why the relatively high pressure is set as the target servo pressure is that by decreasing the operation number of times of the pressure decreasing valve 41 and the pressure increasing valve 42 (especially pressure increasing valve 42), long service life can be achieved for these control valves.

CITATION LIST

[Patent Literature] Patent Literature 1: JP2013-107562 A

SUMMARY OF INVENTION

Technical Problem(s)

However, according to the vehicle brake device as explained above, the servo pressure supplied from the servo pressure generating device 44 is set to be relatively high when ESC control or TRC control is performed. Accordingly, the master pressure supplied from the master cylinder 1 becomes also relatively high. Therefore, the pressure difference between the master cylinder 1 side and the wheel cylinder side of the holding valve and the pressure decreasing valve of the brake actuator 53 becomes large to generate a large hydraulic pressure variation upon opening and closing control of the holding valve. Thus, there is an issue that the vibration and fluid hammering noise occur.

Accordingly, this invention was made in consideration with the above-mentioned situation and the objective of the invention is to provide a vehicle control device which can suppress occurrence of the hydraulic pressure variation upon opening and closing control of the holding valve and the pressure decreasing valve of the brake actuator, in a vehicle brake device which can perform an ESC control and a TRC control.

Solution to Problem(s)

The brake device according to a first aspect of the invention is characterized in that in a vehicle control device applicable to a vehicle brake device which includes a master cylinder wherein a master piston is driven to move by a servo pressure in a servo chamber and by the movement of the master piston, a master pressure in a master chamber is changed, a servo pressure generating device formed by a high pressure source, a pressure increasing control valve disposed between the high pressure source and the servo chamber for controlling a flow of a brake fluid from the high pressure source to the servo chamber and a first pressure decreasing control valve disposed between a low pressure source and the servo chamber for controlling the flow of the brake fluid from the servo chamber to the low pressure source, generating the servo pressure in the servo chamber, a servo pressure sensor which detects the servo pressure, a plurality of wheel cylinders which applies a braking force to respective corresponding vehicle wheels in response to respective wheel cylinder pressures and a brake actuator disposed between the master cylinder and the plurality of wheel cylinders and structured so that a target wheel cylinder pressure which is the wheel cylinder pressure in response to a desired braking force is individually applicable to the respective wheel cylinders by a holding control valve and a second pressure decreasing control valve both of which are provided at each corresponding wheel cylinder based on the master pressure of the master cylinder. The vehicle control device controls the pressure increasing control valve and the first pressure decreasing control valve so that an actual servo pressure detected by the servo pressure sensor becomes a target servo pressure; and, while a brake operating member is not operated and a wheel cylinder pressure supplying control is executed to supply the target wheel cylinder pressure to the respective wheel cylinders individually, the vehicle control device sets a target servo pressure maximum value which is a value for incrementally increasing the target servo pressure to a first predetermined target servo pressure which is set to a value smaller than a maximum output pressure of the servo pressure generating device; calculates a target wheel cylinder pressure maximum value which is a maximum value among the target wheel cylinder pressures to be applied to the respective vehicle wheels, and when the execution of the wheel cylinder pressure supplying control starts, sets the target servo pressure to be the target wheel cylinder pressure maximum value when a firstly occurred rising inclination of the target wheel cylinder pressure maximum value is equal to or more than a minimum increment of an output of the servo pressure generating device per unit time and the target wheel cylinder pressure maximum value is less than the servo pressure maximum value and at the same time when the target wheel cylinder pressure maximum value is larger than the previously calculated first determined target servo pressure.

According to the above feature of the invention, while the brake operating member is not operated and the wheel cylinder pressure supplying control such as ESC control and TRC control, which individually supplies a target wheel cylinder pressure to the respective wheel cylinders, is executed, the actual servo pressure which is smaller than the maximum output pressure of the servo pressure generating device and is greater than the wheel cylinder pressure which is required by the each wheel cylinder is supplied. Therefore, the master pressure supplied from the master cylinder is relatively low compared to the conventional device. Thus, the pressure difference in the pressure of the holding control valve and the second pressure decreasing control valve of the brake actuator between the master cylinder side and the wheel cylinder side becomes small. Accordingly, the fluid pressure variation generated upon opening and closing operations of these control valves can be minimized. As a result, vibrations and fluid hammering noise can be minimized in the brake actuator.

The vehicle control device according to a second aspect of the invention is characterized in that in the first aspect, after the execution of the wheel cylinder pressure supplying control starts, the vehicle control device sets the target servo pressure so as to increase the target servo pressure with a lower limit inclination which corresponds to the minimum increment of the output per unit time up to the first predetermined target servo pressure, when an increase inclination of the target wheel cylinder pressure maximum value is smaller than the minimum increment of the output per unit time of the servo pressure generating device. According to the feature above, during the increase control of the actual servo pressure, the inclination of the increment of the actual servo pressure can be prevented to fall below the lower limit of the inclination of the output increase of the servo pressure generating device. Thus, unnecessary operation of the pressure increasing control valve and the first pressure decreasing control valve of the servo pressure generating device can be suppressed.

The vehicle control device according to a third aspect of the invention is characterized in that in the first or the second aspect, after the execution of the wheel cylinder pressure supplying control starts, the vehicle control device sets the target servo pressure maximum value to be a second predetermined target servo pressure which is set to be a value that is larger than the first predetermined target servo pressure and is smaller than the maximum output pressure of the servo pressure generating device, when the target wheel cylinder pressure maximum value becomes equal to or more than the first predetermined target servo pressure. According to the feature above, the target servo pressure can be stepwise increased in response to the wheel cylinder pressure which is required by the wheel cylinder. As a result, wheel cylinder pressure necessary for sufficing the required braking force can be surely applied and at the same time vibrations and fluid hammering noise in the brake actuator can be properly suppressed.

BRIEF EXPLANATION OF ATTACHED DRAWINGS

EMBODIMENTS FOR IMPLEMENTING INVENTION

Figure 1:
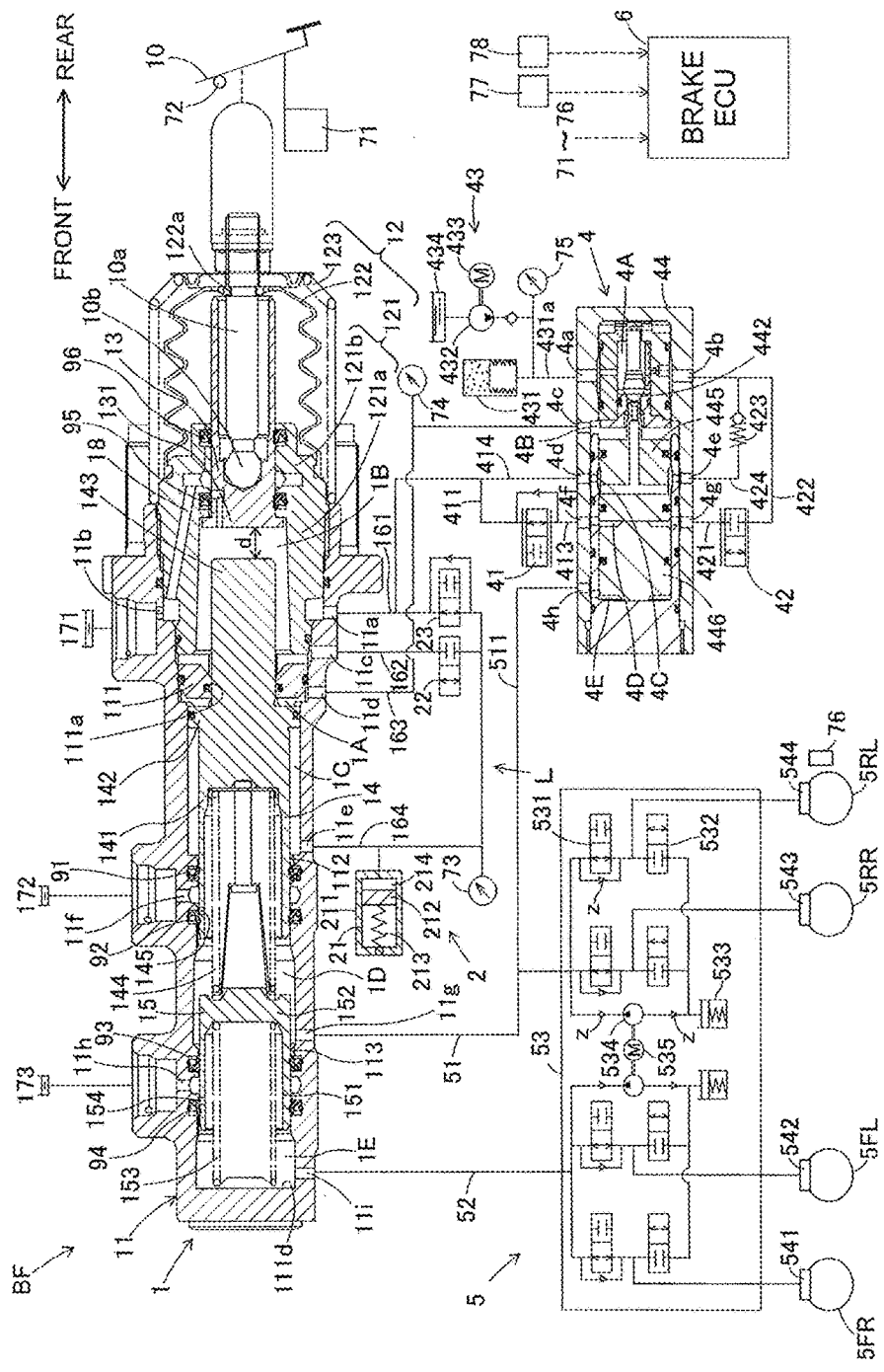
FIG. 1 is a conceptual view of the brake device according to an embodiment of the invention.

The vehicle control device and the vehicle brake device which is controllable by the vehicle control device according to the embodiment of the invention will be explained hereinafter with reference to the attached drawings. It is noted that the shape and the size of each component in the drawings, by which the structural explanation thereof will be made, are not necessarily accurate to the actual product.

As shown in FIG. 1, the brake device is formed by a hydraulic pressure braking force generating device BF which generates the hydraulic pressure braking force and applies the hydraulic pressure braking force to the vehicle wheels 5FR, 5FL, 5RR and 5RL and a brake ECU 6 (corresponding to the vehicle control device) which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, a servo pressure generating device 4, a hydraulic pressure control portion 5 and various sensors 71 through 76 and so on.

(Master Cylinder 1)

The master cylinder 1 is a portion which supplies the hydraulic pressure control portion 5 with the brake fluid in response to the operating amount of a brake pedal 10 (brake operating member) and is formed by a main cylinder 11, a cover cylinder 12, an input piston 13, a first master piston 14 and a second master piston 15 and so on. The master cylinder 1 is structured such that the first master piston 14 is driven to move by the servo pressure in the servo chamber 1A and by this movement of the first master piston 14, the master pressure in the first master chamber 1D is changed. It is noted that the first master piston 14 corresponds to the master piston which slidably moves within the master cylinder 1 and generates a master cylinder hydraulic pressure in response to the servo pressure (disclosed in CLAIMS).

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annulariy shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical potion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first piston 14 is biased rearward by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface and the inner bottom surface 111d of the main cylinder 11 and the pressurizing cylindrical portion 151 of the second master piston 15.

Ports 11a through 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward the inner wall portion 111 and at the same time forward of the port 11c and the port 1id connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91 and 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (stroke amount) of the operation of the brake pedal 10 by a driver (operator) of the vehicle and transmits the detected result to the brake ECU 6. A brake stop switch 72 is a switch which detects whether the brake pedal 10 is operated or not by the driver, using a binary signal (ON-OFF) and a detected signal is sent to the brake ECU 6. It may be possible to provide an operating force sensor which detects an operating force (depression force) in response to the operation of the brake pedal 10 by the operator of the vehicle.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location rearward side of the piston 212. The piston 212 is biased in the rearward side direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

When the first control valve 22 is open and the second control valve 23 is closed, a hydraulic pressure circuit "L" is formed by the first hydraulic pressure chamber 1B, the second hydraulic pressure chamber 1C, the reaction force hydraulic pressure chamber 214, the conduit 162 and the conduit 164. When the input piston 13 slightly advances by the operation of the brake pedal 10, the fluid communication between the first hydraulic pressure chamber 1B and the passage 18 is interrupted and the fluid communication of the second hydraulic pressure chamber 1C which is connected to the hydraulic pressure circuit "L" with components and passages or conduits other than the second hydraulic pressure chamber 1C is interrupted. Thus the hydraulic pressure circuit L is hydraulically in closed state. By the further advance movement of the input piston 13, the brake fluid in response to the stroke of the input piston 13 is flown into the reaction force hydraulic pressure chamber 214 from the first and the second hydraulic pressure chambers 18 and 1C by overcoming the reaction force of the compression spring 213. Thus, the input piston 13 makes a stroke in response to the operation of the brake pedal 10 and the hydraulic pressure in response to the stroke of the piston 13 is generated in the hydraulic pressure circuit L by the reaction force of the compression spring 213. Such hydraulic pressure is transmitted to the operating rod 10a and the brake pedal 10 from the input piston 13 and is transmitted to the driver of the vehicle in addition to the reaction force of the compression spring 213 which biases the operating rod 10a, as a brake reaction force.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state where an electricity is not applied and under this state communication between the first hydraulic pressure chamber 1B and the second hydraulic pressure chamber 1C is interrupted. Due to the closure of the first hydraulic pressure chamber 1B, the brake fluid is nowhere to flow and the input piston 13 and the first master piston 14 are moved integrally keeping the separation distance "d" therebetween to be constant. The first control valve 22 is open under the energized state where an electricity is applied and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the brake fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure (or the reaction force hydraulic pressure) of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is provided for generating the servo pressure and is formed by a pressure decreasing valve (corresponding to the first pressure decreasing control valve) 41, a pressure increasing valve (corresponding to the pressure increasing control valve) 42, a high pressure supplying portion (corresponding to the high pressure source) 43 and a regulator 44 and so on. The servo pressure generating device 4 generates the servo pressure in the servo chamber 1A in response to the operation of the brake pedal 10 by the driver (operator) of the vehicle.

The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir (corresponding to the low pressure source) 171 via the conduits 411, 161 and ports 11a and 11b. As stated, the pressure decreasing valve 41 is disposed between the reservoir 171 and the servo chamber 1A and is referred to as the first pressure decreasing control valve which controls the flow of the brake fluid from the servo chamber 1A to the reservoir 171.

The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422. As stated, the pressure increasing valve 42 is disposed between the high pressure supplying portion 43 and the servo chamber 1A and is referred to as the pressure increasing control valve which controls the flow of the brake fluid from the high pressure supplying portion 43 to the servo chamber 1A. The pressure decreasing valve 41 and the pressure increasing valve 42 correspond to a pilot hydraulic pressure generating device.

The high pressure supplying portion 43 is a portion for supplying the regulator 44 mainly with a highly pressurized brake fluid. The high pressure supplying portion 43 includes an accumulator 431, a hydraulic pressure pump 432, a motor 433 and the reservoir 434 and so on. The reservoir 434 is under the atmospheric pressure and is a low pressure source which pressure is lower than the pressure in the high pressure supplying portion 43.

The accumulator 431 is a tank in which a highly pressurized brake fluid is accumulated and is connected to the regulator 44 and the hydraulic pressure pump 432 via a conduit 431a. The hydraulic pressure pump 432 is driven by the motor 433 and supplies the brake fluid which is reserved in the reservoir 434 to the accumulator 431. The pressure sensor 75 provided in the conduit 431a detects the accumulator hydraulic pressure in the accumulator 431 and the detected signal is sent to the brake ECU 6. The accumulator hydraulic pressure correlates with the accumulated brake fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the brake fluid to the accumulator 431 in order to recover a pressure up to the value equal to or more than the predetermined value.

Figure 2:
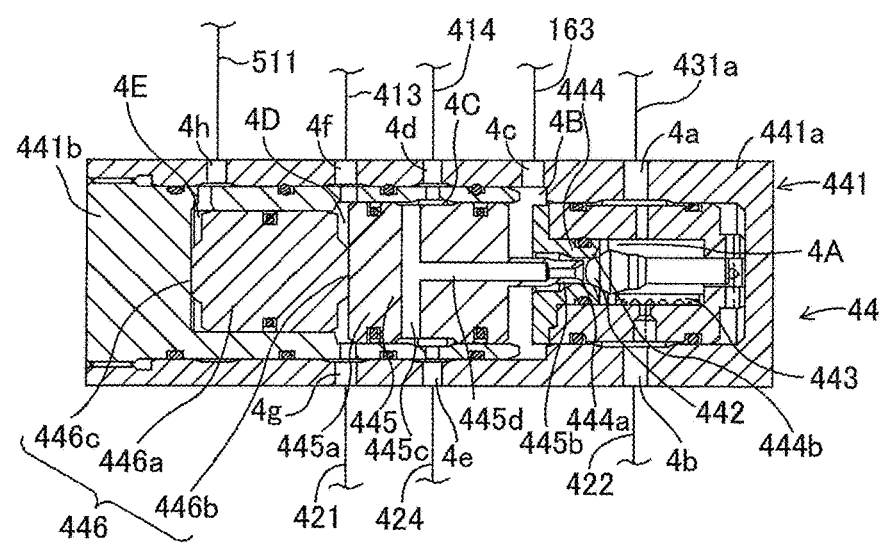
FIG. 2 is a cross sectional view of a regulator according to the first embodiment.

FIG. 2 is a partial cross sectional explanatory view showing the inside of the mechanical type regulator 44 which forms the servo pressure generating device 4. As shown in the drawing, the regulator 44 includes a cylinder 441, a ball valve 442, a biasing portion 443, a valve seat portion 444, a control piston 445 and a sub-piston 446 and so forth.

The cylinder 441 includes a cylinder case 441a formed in a substantially bottomed cylinder-shape having a bottom surface at one end thereof (at the right side in the drawing)

and a cover member 441b closing an opening of the cylinder case 441a (at the left side thereof in the drawing). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a cylindrical plurality of ports which is arranged opposite to the respective ports 4a through 4h.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside of the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve member 444 supports the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated (in contact) on the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the brake fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is arranged in the cylinder 441 in a coaxial and liquid-tight manner on the cylinder opening side of the valve seat portion 444, the main body portion 445a being slidably movable in the axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both end portions thereof open at a circumferential surface of the main body portion 445a. A portion of an inner circumferential surface of the cylinder 441 corresponding to an opening position of the passage 445c is provided with the port 4d and is formed to be recessed, which recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends up to the inside of the main body portion 445a and is connected to the passage 445c.

A space defined by the end surface of the cylinder bottom surface side of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner and slidably movable in the axial direction on the cylinder opening side of the main body portion 445a.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the brake fluid. As shown in FIG. 1, the pressure sensor 74 is a sensor that detects the servo pressure (corresponding to the "output hydraulic pressure") to be supplied to the servo chamber 1A and is connected to the conduit 163. The pressure sensor 74 sends the detected signal to the brake ECU 6.

(Brake Actuator 53)

The first master chamber 1D and the second master chambers 1E which generate the master cylinder hydraulic pressure (master pressure) are connected to the wheel cylinders 541 through 544 via the conduits 51 and 52 and the brake actuator 53. Each of the wheel cylinders 541 through 544 is configured to be able to apply braking force corresponding to the master pressure from the master cylinder 1. The wheel cylinders 541 through 544 form a brake device for the vehicle wheels 5FR through 5RL. In more specifically, the port 11g of the first master chamber 1D and the port 11i of the second master chamber 1E are connected to the well-known brake actuator 53 via the conduits 51 and 52, respectively. The brake actuator 53 is connected to the wheel cylinders 541 through 544 which are operated to perform braking operation at the wheels 5FR through 5RL.

The brake actuator 53 will be explained hereinafter representing the structure and operation regarding to one vehicle wheel (5RL) and the explanation of the other structures are omitted due to the similarity thereof. The brake actuator 53 includes a holding valve 531, a pressure decreasing valve 532 (corresponding to the second pressure decreasing control valve), a reservoir 533, a pump 534 and a motor 535. The holding valve 531 is a normally open type electromagnetic valve and the opening and closing operation thereof is controlled by the brake ECU 6. One end of the holding valve 531 is connected to the conduit 51 and the other end thereof is connected to the wheel cylinder 544 and the pressure decreasing valve 532. In other words, the holding valve 531 serves as an input valve of the brake actuator 53.

The pressure decreasing valve 532 is a normally closed type electromagnetic valve and the opening and closing operation thereof is controlled by the brake ECU 6. One end of the pressure decreasing valve 532 is connected to the wheel cylinder 544 and the holding valve 531 and the other end thereof is connected to the reservoir 533. When the pressure decreasing valve 532 is opened, the fluid communication between the wheel cylinder 544 and the reservoir 533 is established.

The reservoir 533 is served as reserving the brake fluid and is connected to the conduit 51 via the pump 534. The suction port of the pump 534 is connected to the reservoir 533 and the discharge port is connected to the conduit 51 via a check valve "z". It is noted here that the check valve "z" allows a fluid flow from the pump 534 to the conduit 51 (first master chamber 1D) and restricts the flow in the reverse direction. The pump 534 is driven by the operation of the motor 535 in response to the instructions from the brake ECU 6. The pump 534 suctions the brake fluid from the reservoir 533 in which the brake fluid is reserved and returns the brake fluid into the first master chamber 1D while the ABS control, TRC (Traction Control) control, or ESC (anti-skid control) is performed. It is noted that a damper (not shown) is provided at the upstream side of the pump 534 in order to dampen the pulsation of the brake fluid ejected by the pump 534. Thus, the brake actuator 53 is provided between the master cylinder 1 and the wheel cylinders 541 through 544 and is structured to be capable of applying a target wheel cylinder which is a wheel cylinder pressure responding to a desired braking force based on the master cylinder pressure of the master cylinder 1 by means of respective holding valves and pressure decreasing valves provided corresponding respective wheel cylinders 541 through 544.

The brake actuator 53 includes a wheel speed sensor 76 which detects a wheel speed at each vehicle wheel 5FR, 5FL, 5RR and 5RL. The detection signal which indicates the wheel speed detected by the wheel speed sensor 76 is outputted to the brake ECU 6. It is noted that in FIG. 1 only one wheel speed sensor 76 is illustrated, but each one wheel speed sensor is provided at each vehicle wheel 5FR, 5FL, 5RR and 5RL.

In the brake actuator 53, the brake ECU 6 executes an ABS control (Anti-lock braking control) by controlling the switching over of each holding valve and the pressure decreasing valve based on the master pressure, state of wheel speed and front/rear acceleration and adjusting the brake hydraulic pressure to be applied to each wheel cylinder 541 through 544, i.e., braking force to be applied to each wheel 5FR through 5RL by operating the motor when necessary. The brake actuator 53 is a device which supplies the brake fluid supplied from the master cylinder 1 to the wheel cylinders 541 through 544 by adjusting the amount and the timing based on the instructions from the brake ECU 6. The brake actuator 53 has a function of actuator which allows the brake fluid to flow into and discharge from the master chamber 1D.

In the brake actuator 53, the brake ECU 6 executes wheel cylinder pressure supplying control in which each target wheel cylinder pressure is individually supplied to each corresponding wheel cylinder 541 through 544 when the brake pedal is not operated. The wheel cylinder pressure supplying control includes, for example, ESC control and TRC control. The ESC control is a control for automatically performing a brake operation to a proper vehicle wheel or automatically controlling an engine output to suppress an instable vehicle state derived from an over steer or under steer state of the vehicle. In other words, the ESC control is a control for applying a necessary braking force to a proper vehicle wheel which is the subject of control to suppress an under steer (or an over steer) state of the vehicle when the driver of the vehicle is not depressing the brake pedal 10 during the vehicle being turning.

The TRC control is a control for preventing an acceleration slip of the vehicle wheel at the time of starting or acceleration. For example, when a drive wheel is idly rotated at the start of the vehicle, a braking force is automatically applied to the drive wheel which is in idle rotation or an engine output is automatically controlled to suppress the idle rotation of the vehicle wheel. It may be possible to detect the state of idle rotation by the vehicle speed and the vehicle wheel speed or the state of idle rotation may be detected by the vehicle wheel speed of the each vehicle wheel.

The brake ECU 6 calculates the target wheel cylinder pressure and the target servo pressure to generate a predetermined braking force which responds to the brake operation by the driver of the vehicle. Further, the brake ECU 6 controls the pressure increasing valve 42 and the pressure decreasing valve 41 so that the target servo pressure and the actual servo pressure agree with each other. By this control, the hydraulic pressure sent out from the accumulator 431 of the servo pressure generating device 4 is controlled by the pressure increasing valve 42 and the pressure decreasing valve 41 to generate the servo pressure in the servo chamber 1A. Then the first master piston 14 and the second master piston 15 advance by the generated servo pressure to pressurize the fluid in the first master chamber 1D and the second master chamber 1E. Since the master pressure is approximately equal to the servo pressure, the hydraulic pressures in the first and the second master chambers 1D and 1E are supplied to the wheel cylinders 541 through 544 as the master pressure from the ports 11*g* and 11*i* via the conduits 51 and 52 and the brake actuator 53. In other words, the wheel cylinder pressure is approximately equal to the master pressure. Accordingly, the hydraulic pressure braking force corresponding to the wheel cylinder pressure i.e., the servo pressure is applied to the vehicle wheels 5FR through 5RL.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and so on. The operating amount (pedal stroke) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the wheel speed sensors 76.

Further, the brake ECU 6 is connected to a yaw rate sensor 77 and detection signal therefrom is inputted to the brake ECU 6. The yaw rate sensor 77 is attached to the vehicle body in a vicinity of the center of gravity of the vehicle body to detect the actual yaw rate generated at the vehicle.

Still further, the brake ECU 6 is connected to a steering sensor 78 and detection signal therefrom is inputted to the brake ECU 6. The steering sensor 78 detects an operation amount (rotation angle) of the steering wheel (not shown). The total gear ratio of the steering gear mechanism of the steering device (not shown) is set to a predetermined value and the value is represented by a ratio of rotation angle of the steering wheel (steering wheel angle)/steered angle of a steered wheel. Accordingly, the steering sensor 78 is a rudder sensor which detects a rudder angle of the steered wheel of the vehicle.

(Control Embodiment)

Next, the control embodiment of operation of the vehicle brake device structured above will be explained with reference to the flowchart illustrated in FIG. 3. The brake ECU 6 repeatedly executes program corresponding to the flowchart every predetermined short time period (control cycle time).

Figure 3:
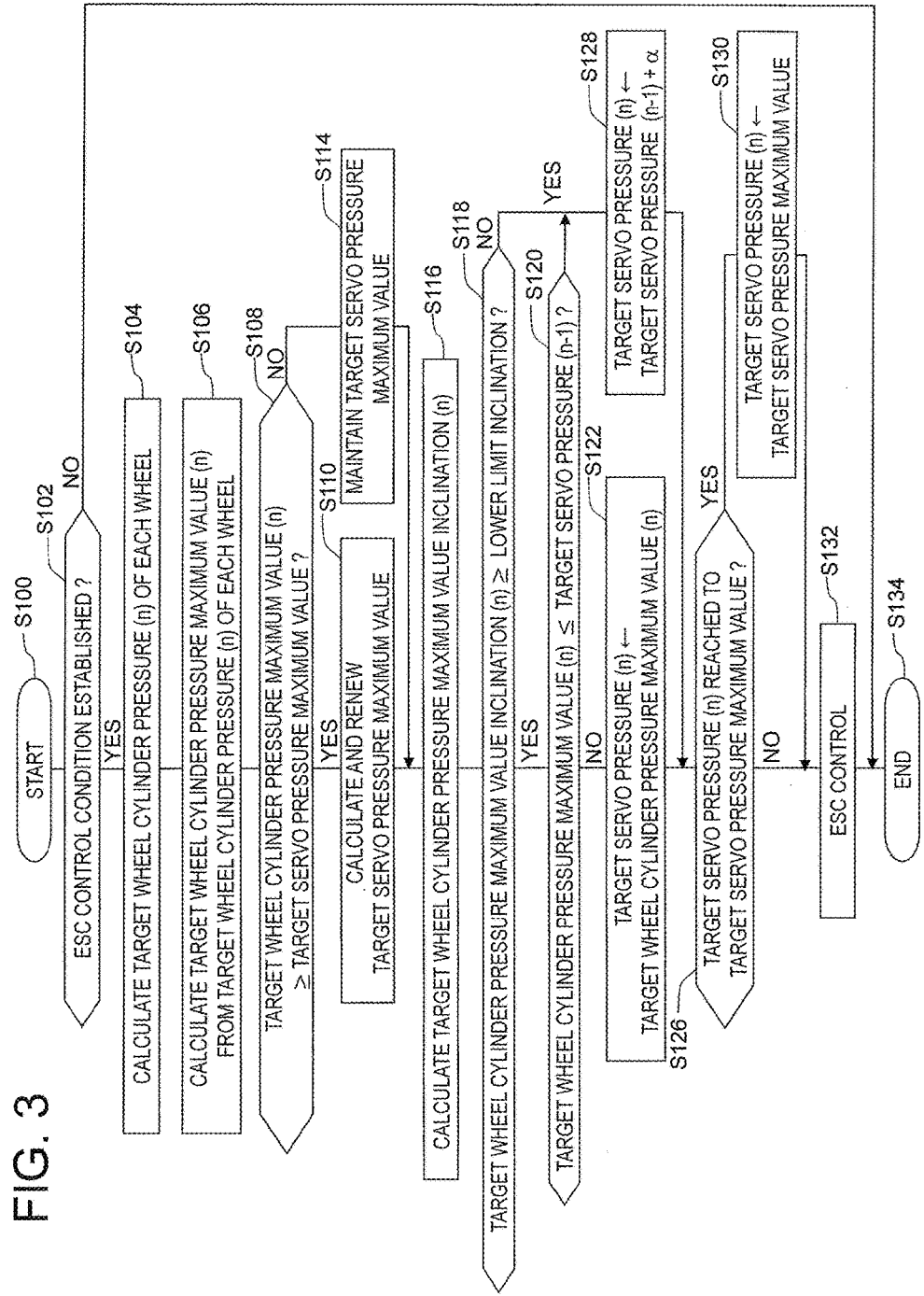
FIG. 3 is a flowchart of a control program (control example) executed by the brake ECU shown in FIG. 1.

The brake ECU 6 judges whether the ESC control condition is established or not at the step S102 every time the execution of the program starts at the step S100 in FIG. 3. If the brake ECU 6 judges that the ESC control condition is established ("YES" at the step S102), the brake ECU 6 advances the program to step S104. If the brake ECU 6 judges that the ESC control condition is not established ("NO" at the step S102), the brake ECU 6 advances the program to step S134.

The starting condition of the ESC control is concretely that the yaw rate deviation $\Delta Y\gamma$ is equal to or more than an over steer restricting control threshold value (hereinafter referred to as simply OS restricting control threshold value) or the yaw rate deviation $\Delta Y\gamma$ is equal to or less than an under steer restricting control threshold value (hereinafter referred to as simply US restricting control threshold value). Further, the end condition of the ESC control is for example, that the yaw rate deviation $\Delta Y\gamma$ is less than the OS restricting control threshold value or the yaw rate deviation $\Delta Y\gamma$ is more than the US restricting control threshold value and that the state that the brake control amount and the engine control amount which the ESC control requires, keeps zero (0) for a predetermined time period.

The yaw rate deviation $\Delta Y\gamma$ is a value calculated by subtracting the target yaw rate from the actual yaw rate. The actual yaw rate is an actual yaw rate generated at the vehicle indicating the direction and the size of the yaw rate detected by the yaw rate sensor 77. The target yaw rate is calculated by the following mathematic formula (M1) using the rudder angle $\xi$ of the steered wheel and the vehicle speed V.

$$\text{Target yaw rate}=((V\cdot\xi)/L)\cdot(1/(1+A\cdot V^2)) \quad [M1]$$

In the formula, the symbol "L" designates a wheel base of the vehicle and "A" designates a stability factor. Further, the rudder angle $\xi$ of the steered wheel indicates an angle in a steering direction relative to a direction where the vehicle travels in a straight line. The rudder angle $\xi$ of the steered wheel is calculated based on the steering wheel angle $\theta$ ($\xi$=steering wheel angle $\theta/n$). The steering wheel angle $\theta$ is calculated by increasing or decreasing the previous steering wheel angle $\theta$ by a predetermined angle $\Delta\theta$ in response to a rotation direction (detected by the way how the level of the two phase pulse train signals changes) of a steering axis (steering), every time the level of the both pulse train signals changes based on the two phase pulse train signals inputted from the steering sensor 78. The symbol "n" indicates the total gear ratio of the steering device.

The brake ECU 6 calculates the target wheel cylinder pressure (n) of each vehicle wheel 5FR, 5FL, 5RR and 5RL at the step S104. In more concretely, the brake ECU 6 calculates the vehicle wheel to which the braking force is applied and the braking force thereof based on the yaw rate deviation $\Delta Y\gamma$ and sets the wheel cylinder pressure corresponding to the calculated braking force as the target wheel cylinder pressure.

For example, when the yaw rate deviation $\Delta Y\gamma$ is equal to or less than the US restricting control threshold value, the vehicle wheel to which the braking force is applied is the front left wheel 5FL, such that the braking force is applied to the inside wheel in a turning direction (under steer restriction control) so that the vehicle is directed towards turning inside (the left side in the case of a left turn). On the other hand, when the yaw rate deviation $\Delta Y\gamma$ is equal to or more than the OS restricting control threshold value, the vehicle wheel to which the braking force is applied is the front right wheel 5FR, such that the braking force is applied to the outside wheel in a turning direction (over steer restriction control) so that the vehicle is directed towards turning outside (the right side in the case of a left turn). It is noted that the control to restrict an under steer is the under steer restricting control (hereinafter referred to as US restricting control), and control to restrict an over steer is the over steer restricting control (hereinafter referred to as OS restricting control).

The brake ECU 6 calculates the maximum value among the previously calculated target wheel cylinder pressures at the vehicle wheels 5FR, 5FL, 5RR and 5RL, as the target wheel cylinder pressure maximum value (n) at the step S106. It is noted that the target wheel cylinder pressure maximum value (n) is the target wheel cylinder pressure maximum value calculated at the control cycle of this time and the target wheel cylinder pressure maximum value (n−1) is the target wheel cylinder pressure maximum value calculated at the control cycle of last time. Further, the target servo pressure (n) is the target servo pressure set at the control cycle of this time and the target servo pressure (n−1) is the target servo pressure set at the control cycle of last time.

The brake ECU 6 renews the target servo pressure maximum value when the target wheel cylinder pressure maximum value is equal to or more than the target servo pressure maximum value and maintains the target servo pressure maximum value when the target wheel cylinder pressure maximum value is less than the target servo pressure maximum value at the steps S108 through S114. The target servo pressure maximum value includes a plurality of set values. For example, the target servo pressure maximum value includes a target maximum value at a low friction coefficient road surface set when the vehicle is running on a road surface with a low friction coefficient, a target maximum value at an intermediate friction coefficient road surface set when the vehicle is running on a road surface with an intermediate friction coefficient, which is higher than the low friction coefficient and a target maximum value at a high friction coefficient road surface set when the vehicle is running on a road surface with a high friction coefficient, which is higher than the intermediate friction coefficient. At the start of ESC control, the target servo pressure maximum value is set to the target maximum value at the low friction coefficient road surface.

The target servo pressure maximum value is set to a value smaller than the maximum output pressure of the servo pressure generating device 4. The target maximum value at the low friction coefficient road surface corresponds to a target servo pressure first predetermined value and the target maximum value at the intermediate friction coefficient road surface corresponds to a target servo pressure second predetermined value which is set to a value larger than the target servo pressure first predetermined value and smaller than the maximum output pressure of the servo pressure generating device 4.

The brake ECU 6 judges whether the target wheel cylinder pressure maximum value (n) calculated at the control cycle of this time is equal to or larger than the target servo pressure maximum value calculated at the control cycle of last time at the step S108. When the brake ECU 6 judges that the target wheel cylinder pressure maximum value (n) is equal to or larger than the target servo pressure maximum value, the brake ECU 6 judges to be "YES" at the step S108 and the program goes to the step S110. At the step S110, the brake ECU 6 increases the value of the target servo pressure maximum value (n) more than the value at the control cycle of last time. For example, when the target servo pressure maximum value of last time corresponds to the target maximum value at the low friction coefficient road surface, the target servo pressure maximum value is stepped up to the target maximum value at the intermediate friction coefficient road surface which is the value one step up relative to the target maximum value at the low friction coefficient road surface.

On the other hand, when the brake ECU 6 judges that the target wheel cylinder pressure maximum value (n) is less than the target servo pressure maximum value, the brake ECU 6 judges to be "NO" at the step S108 and the program goes to the step S114. At the step S114, the brake ECU 6 maintains the value of the target servo pressure maximum value (n) to the value at the control cycle of last time. For example, when the target servo pressure maximum value of last time corresponds to the target maximum value at the low friction coefficient road surface, the target servo pressure maximum value is maintained at the target maximum value at the low friction coefficient road surface.

The brake ECU 6 calculates the target wheel cylinder pressure maximum value inclination which corresponds to the speed inclination of the target wheel cylinder pressure maximum value at the step S116. For example, the brake ECU 6 calculates the target wheel cylinder pressure maximum value inclination (n) of this time based on the target wheel cylinder pressure maximum value (n−1) calculated at the control cycle of last time and the target wheel cylinder pressure maximum value (n) calculated at the control cycle of this time.

The brake ECU 6 sets the target servo pressure based on the target wheel cylinder pressure maximum value inclination at the steps S118 through S130. The brake ECU 6 judges to be "YES" at the step S118 after the start of the ESC control (after the target servo pressure maximum value is stepped up) and the first time the target wheel cylinder pressure maximum value inclination (n) becomes equal to or more than the lower limit inclination. Further, at the step S120, the brake ECU 6 judges whether the target wheel cylinder pressure maximum value (n) is equal to or less than the target servo pressure (n−1) calculated at the control cycle of last time. When the target wheel cylinder pressure maximum value (n) is judged to be equal to or larger than the target servo pressure (n−1) calculated at the control cycle of last time, the brake ECU 6 judges to be "NO" and the target servo pressure (n) is set to be the target wheel cylinder pressure maximum value (n) (at the step S122). Thus, upon execution of the ESC control and when the target wheel cylinder pressure maximum value is larger than the target servo pressure, the target servo pressure can be raised in response to the increase of the target wheel cylinder pressure maximum value. In other words, the actual servo pressure is only increased and no decrease is made. The actual servo pressure which is necessary and sufficient for supplying necessary wheel cylinder pressure can be generated. It is noted that the lower limit inclination is a speed inclination corresponding to the minimum output per unit time of the servo pressure generating device 4.

Thereafter, the brake ECU 6 judges to be "YES" at the steps S118 and S120, even the target wheel cylinder pressure maximum value inclination (n) becomes equal to or more than the lower limit inclination, after the start of the ESC control and when the target wheel cylinder pressure maximum value (n) is lower than the target servo pressure (n−1). Then the target servo pressure (n) is set so that the target servo pressure (n) increases at a speed corresponding to the lower limit inclination (at the step S128: which will be explained in detail later) and eventually the target servo pressure (n) is set to be the target servo pressure maximum value (Step S130).

The brake ECU 6 judges to be "NO" at the step S118 after the start of the ESC control and when the wheel cylinder pressure maximum value inclination (n) is lower than the lower limit inclination. Then the brake ECU 6 sets the target servo pressure (n) to be increasing with a speed in response to the lower limit inclination. In detail, the brake ECU 6 sets the target servo pressure (n) to a value added by a predetermined value a to the target servo pressure (n−1) at the control cycle of last time at the step S128. The value α corresponds to the lower limit inclination.

The brake ECU 6 judges to be "YES" at the step S126 after the start of the ESC control and when the target servo pressure (n) reached to the target servo pressure maximum value. Then the brake ECU 6 sets the target servo pressure (n) to the target servo pressure maximum value (step S130). Thus, the target servo pressure would never exceed the target servo pressure maximum value.

The brake ECU 6 executes the ESC control at the step S132. In detail, the brake ECU 6 executes the control of pressure increasing valve 42 and the pressure decreasing valve 41 (feedback control) so that the actual servo pressure detected by the pressure sensor 74 becomes the target servo pressure (n) calculated as explained above. Further, the brake ECU 6 controls the brake actuator 53 so that the target wheel cylinder pressure is applied to a vehicle wheel which needs a braking force. The target wheel cylinder pressure is applied in response to the braking force needed by the vehicle wheel. Thereafter, the brake ECU 6 advances the program to the step S134.

(Explanation on Time Chart)

Figure 4:
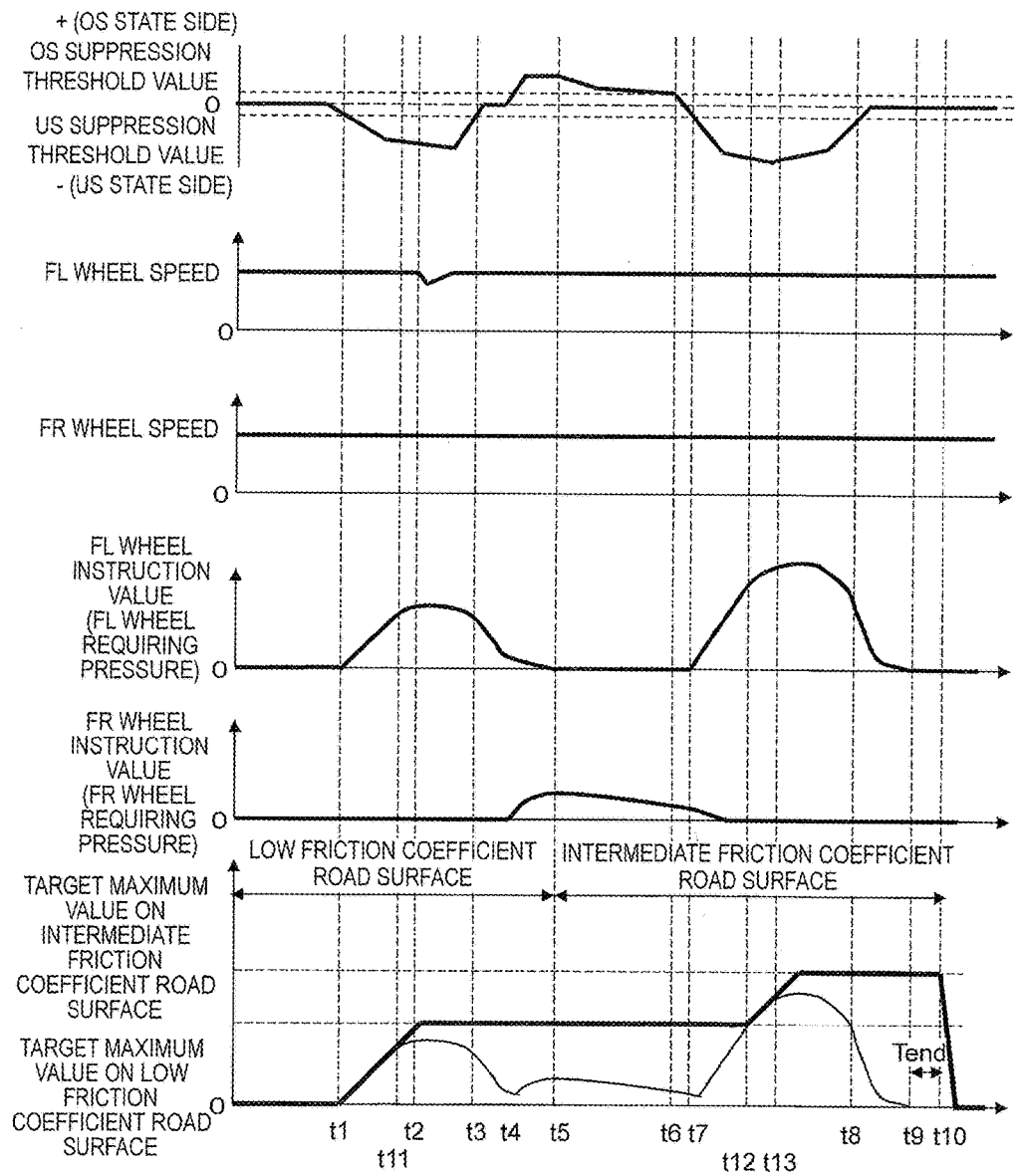
FIG. 4 is a time chart showing an operation of the vehicle brake device according to the control example.

The time char shown in FIG. 4 will be explained. In FIG. 4, the first chart indicates the vehicle state by a yaw rate deviation, the second chart indicates the vehicle wheel speed at the front left wheel 5FL, the third chart indicates the vehicle wheel speed at the front right wheel 5FR, the fourth chart indicates instruction value to the wheel cylinder 542 of the front left wheel 5FL (i.e., target wheel cylinder pressure of the wheel cylinder 542 or required wheel cylinder pressure of the wheel cylinder 542), a fifth chart indicates instruction value to the wheel cylinder 541 of the front right wheel 5FR (Le., target wheel cylinder pressure of the wheel cylinder 541, or required wheel cylinder pressure of the wheel cylinder 541) and a sixth chart indicates the target servo pressure (bold solid line) and the target wheel cylinder pressure maximum value (fine solid line). The explanation will be made when the vehicle is left turning movement. It is noted here that in this embodiment, the polarity of the yaw rate (plus or minus) by right or left turning is not considered and it is presumed that the yaw rate at running in straight line is defined to be zero (0) and the more the degree of turning, the more the plus yaw rate value increases.

(Time t1)

At the time t1, the US restricting control is started due to the decrease of the yaw rate deviation ΔYγ to be less than the US restricting control threshold value. The brake control subject is the front left wheel 5FL positioned inside of the turning movement. The target wheel cylinder pressure of the wheel cylinder 542 at the front left vehicle wheel 5FL is calculated based on the yaw rate deviation ΔYγ. Since the control subject is only the front left vehicle wheel 5FL, the target wheel cylinder pressure of the wheel cylinder 542 is the target wheel cylinder pressure maximum value. At this time, since the target wheel cylinder pressure maximum value inclination is equal to or more than the lower limit inclination and the servo pressure is increasing for the first time after the start of the ESC control, the target wheel cylinder pressure maximum value (n) becomes larger than the target servo pressure (n−1) calculated at the control cycle of last time. Accordingly, the target servo pressure is set to the target wheel cylinder pressure maximum value (step S122).

Thus, during the time period from the time t1 until the time t11, the pressure increasing valve 42 and the pressure decreasing valve 41 of the servo pressured generating device 4 are controlled and thus, the actual servo pressure which corresponds to the target wheel cylinder pressure maximum value is generated in the servo chamber 1A. At this time period, the brake actuator 53 is actuated to apply the target wheel cylinder pressure to the wheel cylinder 542 of the front left vehicle wheel 5FL. In other words, the target wheel cylinder pressure maximum value is set to the target servo pressure during the time period from the time t1 until the time t11.

(Time Period From Time t11 Until Time t12)

For the time period from the time t11 until the time t12, since the target wheel cylinder pressure maximum value is equal to or less than the target servo pressure (n−1) even the target wheel cylinder pressure maximum value inclination is less than the lower limit inclination, or equal to or more than the lower limit inclination, the target servo pressure is set to be increasing at a speed in response to the lower limit inclination until the target servo pressure reaches to the target servo pressure maximum value (Step S128). When the target servo pressure reaches to the target servo pressure maximum value, the target servo pressure is maintained at the target servo pressure maximum value (Step S130).

(Time t2)

At the time t2, the friction coefficient on the road surface is low and the front left wheel 5FL makes a slipping, the required braking force at the front left wheel 5FL is decreased to prevent the required braking force from further increasing. Even the braking force is further raised, the wheel merely slips and the braking force applied thereto does not increase. Further, since the target wheel cylinder pressure maximum value inclination becomes smaller than the lower limit inclination at the time t11, the target servo pressure is set to increase at a speed in response to the lower limit inclination at time t11 or later (Step S128). The target servo pressure reaches to the target maximum value at the low friction coefficient road surface, which corresponds to the target servo pressure maximum value between the time t2 and the time t3. The target servo pressure is maintained at the target maximum value at the low friction coefficient road surface after the target servo pressure reached to the target maximum value at the low friction coefficient road surface and until the time point (time t12) when the target wheel cylinder pressure maximum value exceeds the target maximum value at the low friction coefficient road surface. (Step S130).

(Time t3)

After the time t2, the braking force is applied to the front left vehicle wheel 5FL and the yaw rate deviation ΔYγ is reduced. Accordingly, the required braking force to the front left wheel 5FL is decreased. At the time t3, when the yaw rate deviation ΔYγ exceeds the US restricting control threshold value, the target wheel cylinder pressure at the front left vehicle wheel 5FL is decreasing towards zero to finish the US restriction control.

(Time t4)

At the time t4, since the yaw rate deviation ΔYγ has exceeded the OS restricting control threshold value, the OS restricting control starts. The brake control subject is the front right wheel 5FR positioned outside of the turning movement. The target wheel cylinder pressure of the wheel cylinder 541 at the front right vehicle wheel 5FR is calculated based on the yaw rate deviation ΔYγ. Further, the target wheel cylinder pressure of the wheel cylinder 542 at the front left vehicle wheel 5FL is also calculated based on the yaw rate deviation ΔYγ (At this time, the target wheel cylinder pressure of the wheel cylinder 542 is under decreasing operation towards zero). The maximum value of the target wheel cylinder pressure of the wheel cylinder 541 of the front right wheel 5FR is smaller than the maximum value of the last time target wheel cylinder pressure of the wheel cylinder 542 of the front left wheel 5FL.

(Time t5)

At the time t5, the friction resistance on the running road surface of the vehicle is changed from the low friction resistance to the intermediate resistance. Therefore, the yaw rate deviation ΔYγ decreases. As a result, the target wheel cylinder pressure of the wheel cylinder 541 of the front right wheel 5FR decreases.

(Time t6)

At the time t6, when the yaw rate deviation ΔYγ becomes smaller than the OS restricting control threshold value, the target wheel cylinder pressure at the front right vehicle wheel 5FR is decreasing towards zero to finish the OS restriction control.

(Time t7)

At the time t7, the yaw rate deviation ΔYγ becomes again becomes smaller than the US restricting control threshold value and the US restriction control is started. The brake control subject is the front left wheel 5FL positioned inside of the turning movement. The target wheel cylinder pressure of the wheel cylinder 542 at the front left vehicle wheel 5FL is calculated based on the yaw rate deviation ΔYγ. The control subject is only the front left wheel 5FL and accordingly, the target wheel cylinder pressure of the wheel cylinder 542 is the target wheel cylinder pressure maximum value. At this time, the target wheel cylinder pressure maximum value inclination is equal to or more than the lower limit inclination. However, since the target wheel cylinder pressure maximum value is equal to or less than the target servo pressure (n−1) calculated at the control cycle of last time, the target servo pressure is set to the target maximum value at the low friction coefficient road surface which corresponds to the target servo pressure maximum value. (Step S130).

(Time Period From the Time t12 Until the Time t13)

Since the running road surface has an intermediate friction coefficient, compared to the case that the running road surface has a low friction coefficient, the target wheel cylinder pressure maximum value is increased accompanied by the increase of the yaw rate deviation ΔYγ. At the time t12, when the target wheel cylinder pressure maximum value exceeds the target maximum value at the low friction coefficient road surface which corresponds to the target servo pressure, the target servo pressure maximum value is renewed to the target maximum value at the intermediate friction coefficient road surface (Step S110). Further, since the target wheel cylinder pressure maximum value inclination is equal to or more than the lower limit inclination and since the target wheel cylinder pressure maximum value is larger than the target servo pressure (n−1) calculated at the control cycle of last time, the target servo pressure is set to the target wheel cylinder pressure maximum value. (Step S122).

Thus, during the time period from the time t12 until the time t13, the pressure increasing valve 42 and the pressure decreasing valve 41 of the servo pressured generating device 4 are controlled and thus, the actual servo pressure which corresponds to the target wheel cylinder pressure maximum value is generated in the servo chamber 1A. At this time period, the brake actuator 53 is actuated to apply the target wheel cylinder pressure to the wheel cylinder 542 of the front left vehicle wheel 5FL. In other words, the target wheel cylinder pressure maximum value is set to the target servo pressure during the time period from the time t12 until the time t13.

(Time Period From the Time t13 Until the Time t10)

For the time period from the time t13 until the time t10, since the target wheel cylinder pressure maximum value inclination is less than the lower limit inclination, the target servo pressure is set to be increasing at a speed in response to the lower limit inclination until the target servo pressure reaches to the target servo pressure maximum value (Step S128). When the target servo pressure reaches to the target servo pressure maximum value, the target servo pressure is maintained at the target servo pressure maximum value (target maximum value at the intermediate friction coefficient road surface) (Step S130).

(Time t8/Time t9)

At the time t8, when the yaw rate deviation ΔYγ exceeds the US restriction control threshold value, the target wheel cylinder pressure at the front left vehicle wheel 5FL is decreasing towards zero to finish the US restriction control. At the time t9, the target wheel cylinder pressure at the front left vehicle wheel 5FL is decreased to zero. The ESC control finishes at the time point (time t10) after a predetermined time period "Tend" where all of the target wheel cylinder pressures at the all wheels are maintained at the value "zero" passed from the time t9. Then the target servo pressure is set to be zero.

As explained, according to the embodiment of the invention, the brake ECU 6 (vehicle control device) controls the pressure increasing valve 42 and the pressure decreasing valve 41 (first pressure decreasing control valve) so that the actual servo pressure detected by the pressure sensor 74 (servo pressure sensor) becomes the target servo pressure (Step S132), and, while the brake pedal 10 (brake operating member) is not operated and a wheel cylinder pressure supplying control is executed to supply the target wheel cylinder pressure to the respective wheel cylinders 541 through 544 individually, the vehicle control device 6 sets the target servo pressure maximum value to a first predetermined target servo pressure (target maximum value at the low friction coefficient road surface) which is set to a value smaller than a maximum output pressure of the servo pressure generating device 4 (Steps S108, S110 and S114), calculates a target wheel cylinder pressure maximum value which is a maximum value among the target wheel cylinder pressures to be applied to the respective vehicle wheels 5FR, 5FL, 5RR and 5RL (Step S106); and when the execution of the wheel cylinder pressure supplying control starts, sets the target servo pressure to be the target wheel cylinder pressure maximum value when a firstly occurred rising inclination of the target wheel cylinder pressure maximum value is equal to or more than a minimum increment of an output of the servo pressure generating device 4 per unit time and at the same time when the target wheel cylinder pressure maximum value is larger than the previously calculated target servo pressure (Step S122).

According to the above feature of the invention, while the brake pedal 10 (brake operating member) is not operated and the wheel cylinder pressure supplying control such as ESC control and TRC control, which individually supplies a target wheel cylinder pressure to the respective wheel cylinders 541 through 544, is executed, the actual servo pressure which is smaller than the maximum output pressure of the servo pressure generating device 4 and is greater than the wheel cylinder pressure which is required by the each wheel cylinder 541 through 544 is supplied. Therefore, the master pressure supplied from the master cylinder 1 is relatively low compared to the conventional device. Thus, the pressure difference in the pressure of the holding valve 531 (holding control valve) and the pressure decreasing valve 532 (second pressure decreasing control valve) of the brake actuator 53 between the master cylinder 1 side and the wheel cylinders 541 through 544 side becomes small. Accordingly, the fluid pressure variation generated upon opening and closing operations of these control valves can be minimized. As a result, vibrations and fluid hammering noise can be minimized in the brake actuator 53.

Further, after the execution of the wheel cylinder pressure supplying control starts, the brake ECU 6 (vehicle control device) sets the target servo pressure so as to increase the target servo pressure with a lower limit inclination which corresponds to the minimum increment of the output per unit time up to the first predetermined target servo pressure (target maximum value at the low friction coefficient road surface), when an increase inclination of the target wheel cylinder pressure maximum value (target wheel cylinder pressure maximum value inclination) is smaller than the minimum increment of the output per unit time of the servo pressure generating device 4 (Step S128). According to the feature above, during the increase control of the actual servo pressure, the inclination of the increment of the actual servo pressure can be prevented to fall below the lower limit of the inclination of the output increase of the servo pressure generating device 4. Thus, unnecessary operation of the pressure increasing control valve 42 and the first pressure decreasing control valve 41 of the servo pressure generating device 4 can be suppressed.

Further, after the execution of the wheel cylinder pressure supplying control starts, the brake ECU 6 sets the target servo pressure maximum value to be a second predetermined target servo pressure (target maximum value at the intermediate friction coefficient road surface) which is set to be a value that is larger than the first predetermined target servo pressure (target maximum value at the low friction coefficient road surface) and is smaller than the maximum output pressure of the servo pressure generating device 4, when the target wheel cylinder pressure maximum value becomes equal to or more than the first predetermined target servo pressure (target maximum value at the low friction coefficient road surface) (Step S110). According to the feature above, the target servo pressure can be stepwise increased in response to the wheel cylinder pressure which is required by the each wheel cylinder. As a result, wheel cylinder pressure necessary for sufficing the required braking force can be surely applied and at the same time vibrations and fluid hammering noise in the brake actuator 53 can be properly suppressed.

As a wheel cylinder pressure supplying control, not only the ESC control, but other control, such as, TRC control can be applied in which the target wheel cylinder pressure is individually supplied to each wheel cylinder 541 through 544 when the brake pedal 10 (brake operating member) is not operated. In the TRC control, the target wheel cylinder pressure can be calculated based on the vehicle speed and the vehicle wheel speed or the wheel speed of the each vehicle wheel (for example, drive wheel and driven wheel).

Further, according to the invention, the structure that the servo pressure is applied to the rear side of the first master piston 14 is adapted, but the invention is not limited to this structure and another structure having a master piston that slidable moves within the master cylinder 1 and generates the master cylinder hydraulic pressure in response to the servo pressure. Further, the target servo pressure can be set based on the brake operating force of the brake pedal 10 instead of the operating amount of the brake pedal 10. In such case, a sensor which detects the operating force may be added.

The invention claimed is:

1. A vehicle control device applicable to a vehicle brake device which includes:

a master cylinder wherein a master piston is driven to move by a servo pressure in a servo chamber and by the movement of the master piston, a master pressure in a master chamber is changed;

a servo pressure generating device which generates the servo pressure in the servo chamber, the servo pressure generating device being formed by a high pressure source, a low pressure source, a pressure increasing control valve disposed between the high pressure source and the servo chamber for controlling a flow of a brake fluid from the high pressure source to the servo chamber, and a first pressure decreasing control valve disposed between the low pressure source and the servo chamber for controlling the flow of the brake fluid from the servo chamber to the low pressure source;

a servo pressure sensor which detects the servo pressure;

a plurality of wheel cylinders which apply a braking force to respective corresponding vehicle wheels in response to respective wheel cylinder pressures; and a brake actuator disposed between the master cylinder and the plurality of wheel cylinders and structured so that a plurality of target wheel cylinder pressures which are the wheel cylinder pressures in response to a desired braking force are individually applicable to the respective wheel cylinders based on the master pressure of the master cylinder, the brake actuator including a holding control valve and a second pressure decreasing control valve both of which are provided at each corresponding wheel cylinder, wherein, the vehicle control device controls the pressure increasing control valve and the first pressure decreasing control valve so that the servo pressure detected by the servo pressure sensor becomes a target servo pressure;

while a brake operating member is not operated and a wheel cylinder pressure supplying control is executed to supply the target wheel cylinder pressures to the respective wheel cylinders individually, sets a target servo pressure maximum value to a first predetermined target servo pressure, the target servo pressure maximum value being a maximum value of the target servo pressure, the first predetermined target servo pressure being one of a plurality of set values, the plurality of set values being values smaller than a maximum output pressure of the servo pressure generating device;

calculates a target wheel cylinder pressure maximum value which is a maximum value among the target wheel cylinder pressures to be applied to the respective wheel cylinders; and sets the target servo pressure, when the target wheel cylinder pressure maximum value is lower than a previous target pressure, so that the target servo pressure increases at a lower limit inclination until the target servo pressure reaches the target servo pressure maximum value, the previous target pressure being a target pressure which is calculated at a control cycle of last time, the control cycle being a cycle which is repeatedly executed to set a target pressure, the lower limit inclination being a speed inclination corresponding to a minimum output per unit time of the servo pressure generating device.

2. The vehicle control device according to claim 1, wherein, the vehicle control device sets the target servo pressure so that the target servo pressure increases at the lower limit inclination until the target servo pressure reaches the target servo pressure maximum value, when an increase inclination of the target wheel cylinder pressure maximum value is smaller than the lower limit inclination.

3. The vehicle control device according to claim 1, wherein, the vehicle control device renews the target servo pressure maximum value to a second predetermined target servo pressure from the first predetermined target servo pressure when the target wheel cylinder pressure maximum value is equal to or more than the first predetermined target servo pressure, the second predetermined target servo pressure being one of a plurality of values that is larger than the first predetermined target servo pressure.

4. The vehicle control device according to claim 1, wherein,
    the vehicle control device sets the target servo pressure to the target wheel cylinder pressure maximum value when an increase inclination of the target wheel cylinder pressure maximum value is equal or larger than the lower limit inclination.

5. The vehicle control device according to claim 1, wherein,
    the vehicle control device maintains the target servo pressure at the target servo pressure maximum value when the target servo pressure has reached the target servo pressure maximum value and the target wheel cylinder pressure maximum value has not exceeded the target servo pressure maximum value.

\* \* \* \* \*